Dec. 1, 1936. C. H. JENSEN 2,062,886
JOINT AND METHOD OF MAKING THE SAME
Filed Dec. 4, 1933
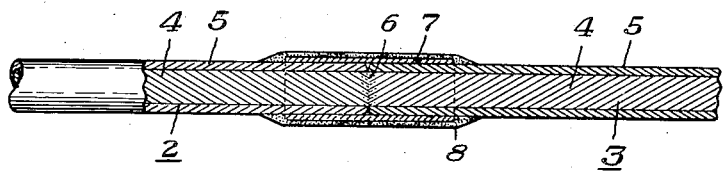
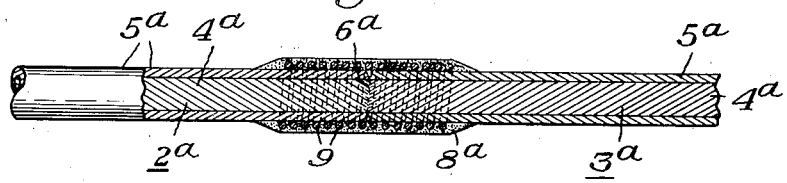
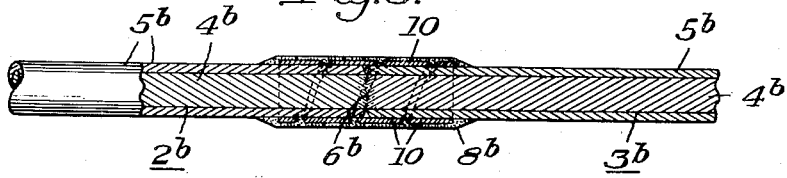
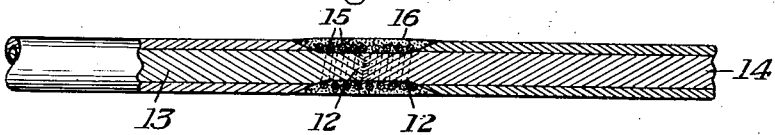
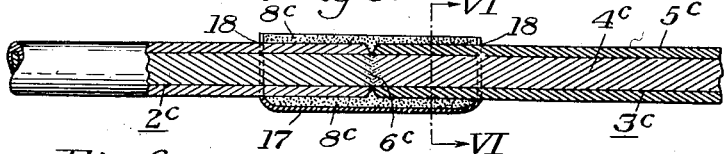
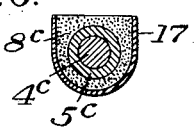
INVENTOR
Claude H. Jensen
by Byrnes, Stebbins, Parmelee & Blenko Patented Dec. 1, 1936

2,062,886

UNITED STATES PATENT OFFICE 2,062,886

JOINT AND METHOD OF MAKING THE SAME

Claude H. Jensen, Pittsburgh, Pa., assignor to Copperweld Steel Company, Glassport, Pa., a corporation of Pennsylvania Application December 4, 1933, Serial No. 700,791

11 Claims. (Cl. 29—148)

This invention relates generally to joints formed between the ends of metallic elements and to a method of making such joints. It is described more particularly herein as applied to the formation of a joint between the ends of copper-coated steel wire or rods, although the invention is of general applicability.

Heretofore it has been the practice in joining the ends of copper-covered wires to scarf the ends and join them by silver solder. As the melting point of silver solder is quite high, the wire becomes annealed during the application of the solder, thereby decreasing the tensile strength of the wire at the joint, as compared to that of hard drawn wire. In joining wire by the silver-solder method, great care must be taken to avoid the presence of air pockets or oxide inclusions which would weaken the joint. Furthermore, precaution must be taken to see that the joint is thoroughly covered with the solder so as to avoid corrosion of exposed portions of the scarf.

The disadvantages inherent in the silver-soldering method are eliminated by the present invention in which the ends of the wire to be joined are butt-welded together. The joint is then covered by a metallic covering which surrounds the joint and is secured to the wires by soldering, brazing or other similar method. The ends of the wire are preferably electrically butt-welded, which operation does not require the great skill of the silver-soldering method. The reinforcing covering surrounding the joint not only compensates for the loss in strength due to the annealing of the wire at the joint caused by the welding operation, but also acts as a protective covering against corrosion as well as maintaining the conductivity of the wire at the joint.

Referring more particularly to the accompanying drawing, Figures 1 to 5 are longitudinal sections through various forms of joints formed between the ends of bimetallic wires each consisting of a steel core coated with copper. In Figure 1 a metal sleeve is used as the covering element. In Figure 2 a metal wire surrounding the joint is used in place of the metal sleeve, and in Figure 3 a metal ribbon surrounding the joint is employed as the covering material.

Figure 4 illustrates a joint in which the ends of the wires to be joined are beveled so that the cross-section through the joint is substantially the same as through the remainder of the wire.

Figure 5 illustrates a joint in which a U-shaped sleeve, shaped like a boat, surrounds the weld and is filled with solder.

Figure 6 is a transverse sectional view on line VI—VI of Figure 5.

Referring more particularly to the accompanying drawing, and for the present to Figure 1, the two wires to be joined are indicated generally by the reference numerals 2 and 3. Each of these wires consists of a steel core 4 and a metallic coating 5, such as copper, which may have been electrolytically deposited on the core or otherwise applied. The ends of the wires are butt-welded together, as indicated by the reference numeral 6. A metal sleeve 7 surrounds the joint and is soldered to the wires by soldering material 8. The metal sleeve 7 is preferably copper or copper alloy where copper-coated wires are to be joined. The soldering material may be tin, an alloy of tin and lead, a silver alloy, or other brazing or soldering metal or metals having a lower melting temperature than either the wires or the metal sleeve.

The metal sleeve reinforces the joint, thereby compensating for the softening effect due to the welding operation and maintains the conductivity of the wire at the joint. The sleeve and solder seal the joint against atmospheric corrosion, the solder also serving to hold the sleeve in place.

In forming the joint, the ends of the wires are welded together, preferably by the electric butt-welding method. The joint is filed or ground down to make it smooth and the sleeve is slipped over the joint and soldered to the wires.

In the embodiment shown in Figure 2, parts corresponding to those already described are indicated by the same reference numerals with the letter "a" suffixed. In this embodiment, a serving of wire 9 is used in place of the metal sleeve shown in Figure 1.

In the embodiment shown in Figure 3, a metal ribbon 10 is employed in place of the metal sleeve or serving of wire previously described, corresponding parts in this figure being indicated by the same reference numerals with the letter "b" suffixed.

In the embodiment shown in Figure 4, the ends 12 of the wires 13 and 14 are reduced so that the diameter at the joint is approximately the same as at other parts of the wires. A serving 15 of wire secured to the wires 13 and 14 by solder 16 is employed for reinforcing the joint, guarding against atmospheric corrosion, and maintaining the conductivity at the joint. The ends of the wires to be joined may be reduced in any of the embodiments irrespective of the particular means, such as a metallic sheath, a metallic ribbon or a serving of wire, which is used for reinforcing the joint.

In the embodiment shown in Figures 5 and 6, parts corresponding to those described in connection with Figure 1 are indicated by the same reference numerals with the letter "c" suffixed. In this embodiment, after the welded joint has been filed or ground down to size, a U-shaped copper sleeve 17 (see Figure 6) is placed under and around the joint; and the ends of the sleeve 17 pinched tight against the wire, thus forming a trough with closed ends like a boat ready for the reception of the soldering material 8c. The latter is then poured, completely covering the wire and joint.

Advantages of the invention arise from the fact that the electric butt-welding operation may be carried out with great uniformity and with less skill than is required in the making of joints according to the previously known silver-soldering method in which the ends of the wires are scarfed and then soldered. The metallic covering surrounding the joint compensates for the loss in strength due to the softening of the wires or other elements which are joined in the welding operation. The metallic covering serves to maintain the full strength and conductivity of the wires at the joint. The soldering material holds the metallic covering firmly in place and seals the joint against atmospheric or other corrosion and also adds somewhat to the strength of the joint.

The term "soldering" is used herein as a term of general definition to include brazing and other similar methods of joining elements by the use of a metal or metals having a lower melting point than the elements which are to be joined.

I have illustrated and described several embodiments of my invention. It is to be understood, however, that the invention may be otherwise embodied or practiced within the scope of the following claims.

I claim:

1. A joint comprising metal elements welded together, and a metallic covering surrounding the adjacent end portions of said elements and the joint therebetween and soldered to said end portions.

2. A joint comprising metal elements butt-welded together at their ends, and a metallic covering surrounding said ends and the joint therebetween and soldered to said elements.

3. A joint comprising wires butt-welded together at their ends, and a metallic covering surrounding the adjacent end portions of the joint therebetween and soldered to said end portions.

4. A joint comprising two metallic elements each consisting of a core having a coating of metal thereon, said elements being butt-welded together at their ends, and a metallic covering surrounding said ends and the joint therebetween and soldered to said elements.

5. A joint comprising two copper-covered steel wires welded together at their ends, and a metallic covering surrounding the adjacent end portions of said wires and the joint therebetween and soldered to said end portions.

6. A joint comprising two copper-covered steel wires butt-welded together at their ends, and a metallic covering surrounding the adjacent end portions of said wires and the joint therebetween and soldered to said end portions.

7. A joint comprising two copper-covered steel wires butt-welded at their ends, and a metallic covering surrounding said ends and the joint therebetween and soldered to said wires so as to seal the joints between said covering and said wires.

8. The method of joining metallic elements, which comprises welding said elements together at their ends, surrounding the adjacent end portions of said elements and the joint therebetween with a metallic covering, and soldering the covering to said elements.

9. The method of joining metallic elements, which comprises butt-welding said elements together at their ends, surrounding said ends and the joint therebetween with a metallic covering, and soldering the covering to said elements.

10. The method of joining wires, which comprises butt-welding the wires together at their ends, surrounding said ends and the joint therebetween with a metallic covering, and soldering the covering to the wires so as to seal the joints between the covering and the wires.

11. The method of joining copper-covered steel wires, which comprises butt-welding the ends of the wires together, applying a copper covering to the joint so as to overlie the adjacent end portions of said wires, and soldering the covering to said portions of the wires.

CLAUDE H. JENSEN.